United States Patent Office 3,275,982
Patented Sept. 27, 1966

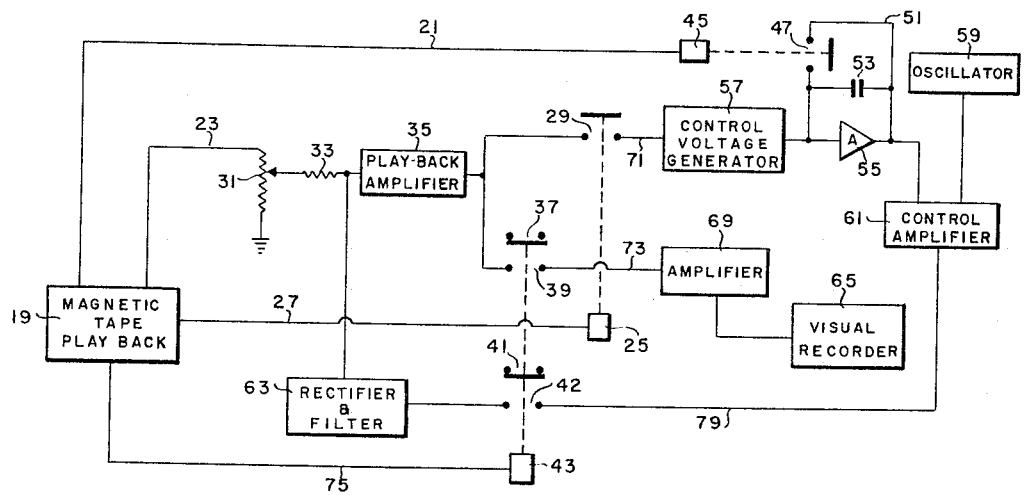
FIG. 2.
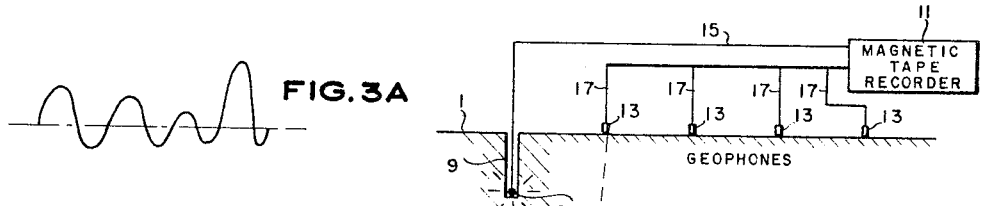
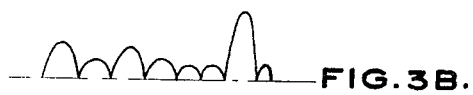
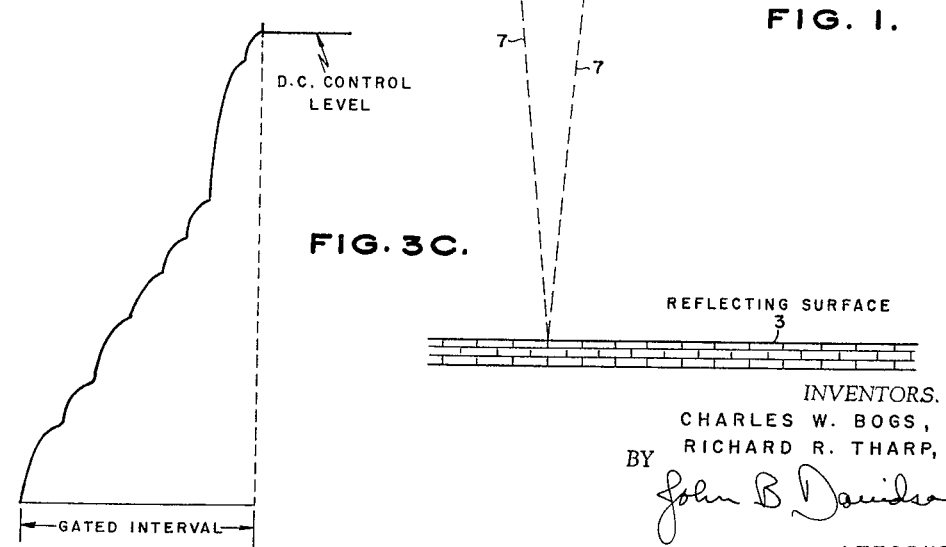
INVENTORS.
CHARLES W. BOGS,
RICHARD R. THARP,
BY John B. Davidson
ATTORNEY.

3,275,982
APPARATUS AND METHOD FOR NORMALIZING OR EQUALIZING SEISMOGRAM TRACES
Charles W. Bogs and Richard R. Tharp, Houston, Tex., assignors, by mesne assignments, to Esso Production Research Company, Houston, Tex., a corporation of Delaware
Filed Nov. 26, 1963, Ser. No. 326,042
7 Claims. (Cl. 340—15.5)

This invention relates to geophysical prospecting utilizing the seismic technique, and more particularly to a technique for eliminating or reducing the effects of variable seismic impulse parameters and variable seismic wave detecting parameters on the traces of a seismogram.

The general method of geophysical exploration utilizing seismic waves comprises the steps of initiating a seismic impulse at or near the surface of the earth, and recording signals generated by geophones as a result of the earth's movements at one or more points more or less spaced from the point of origin of the impulse. The recordation must permit measurement of the time elapsing between the instant of the origination of the impulse and the generation of signals as the result of the subsequent earth movement. The original impulse will set up seismic waves that are transmitted through the earth. Any discontinuity or variation of structure within the earth will reflect and/or refract a portion of the energy in the waves so that a recording of the signals from the receiving points will comprise a number of arriving waves, each derived from the original impulse and each depending from the others in time of arrival, magnitude, and wave shape, or all three.

As the result of variations in seismic wave impulse parameters and variations in recording parameters, the data traces resulting from generation and detection of seismic waves as set forth above will vary both in amplitude and phase, with changes from one impulse point to another, and with changes from one detecting location to another. Adjacent traces may vary considerably even though the same information concerning the geologic column traversed by seismic waves is contained therein.

The variable seismic impulse parameters referred to above are concerned with the size of the dynamite charge used to produce the seismic impulse and the effectiveness of the coupling between the energy source. The variable detecting parameters have to do with variations in geophone construction, effectiveness of the coupling between the earth and the geophone, and the like.

In the past it has been customary to apply automatic gain control in the recordation of data traces produced from electrical signals resulting from detection of seismic waves. The use of automatic gain control on playback of reproducible seismograms will eliminate undesired amplitude variations in the data traces, but it will also result in the loss from the data traces of amplitude information related to the geologic column.

In accordance with the teachings of the present invention, each trace of a reproducible seismogram is reproduced twice. On the first reproduction cycle a control electrical signal is produced having an amplitude that is indicative of the average value of a characteristic of the reproduced signal that is variable as a result of variations in the variable seismic impulse parameters and variable detecting parameters. This control electrical signal is used to control the amplification of the reproduced electrical signal on the second reproduction cycle by an amount that is an inverse function of the control signal. The amplified signal is recorded, and it will be found that the effects of the variable seismic impulse parameters have been removed therefrom.

Objects and features of the invention not apparent from from the above discussion will become evident upon consideration of the following detailed description of the invention taken in connection with the accompanying drawings, wherein:

FIG. 1 is a schematic representation in very elementary form of a seismic observation in accordance with the invention;

FIG. 2 is a schematic diagram of apparatus for use in the practice of the invention; and FIGS. 3A, 3B, and 3C are waveform representations of electrical signals at various points in the schematic diagram of FIG. 2, for the purpose of better understanding the operations of the apparatus of FIG. 2.

With reference now to FIG. 1, there is shown an apparatus suitable for performing a seismic observation. An explosive charge of dynamite 5 is placed in a shot hole 9 and a plurality of seismometers 13 are spaced apart therefrom on the earth's surface 1 at various distances along a seismic traverse. A recording apparatus 11, which may be a magnetic tape recorder of conventional design, is provided which is connected to the explosive charge 5 in the shot hole 9 through an electrical lead 15 and to the various seismometers 13 through electrical leads 17. A source of electricity may be provided in connection with the recorder 11 in the usual fashion by means of which the seismic charge 5 is detonated upon closure of a triggering device in the recorder (not shown). The seismometers 13 may be laid directly on the earth's surface or they may be placed in small holes drilled in the earth's surface and coupled to the earth by a liquid medium. While a conventional explosive charge apparatus for producing seismic waves is illustrated, it is manifest that a weight dropping apparatus and technique may be utilized, such as is described in U.S. Patent No. 2,851,121—McCollum.

When the explosive charge 5 is detonated by the triggering device in recorder 11, an artificial seismic disturbance is produced that is substantially spherical and progresses outwardly in all directions from the explosive charge. When the seismic wave produced by detonation of the explosive charge reaches a subterranean earth interface, such as that designated by the reference numeral 3, a portion of the energy in the wave will pass downwardly through the interface into the earth, but a portion of such energy will be reflected upward toward the earth's surface. A ray path that may be followed by a reflected seismic wave from seismic charge 5 to one of the geophones 13 is designated by reference numeral 7. The seismic energy in traversing the geologic column to others of the geophones 13 will be reflected from other locations on interface 3 in the usual manner. The electrical signals produced by geophones 13 responsive to seismic waves detected thereby will be recorded as data traces on the recording medium of the recorder 11.

With reference now to FIG. 2, there is shown a reproducing apparatus 19 for reproducing as electrical signals the traces of a seismogram, which apparatus may be a magnetic tape reproducing apparatus of conventional design. The reproducing apparatus 19 is shown as having only one output channel 23 in order to avoid cluttering the drawing. However, it is to be understood that there will be an output channel for each of the traces to be reproduced thereby. In FIG. 1 four traces are assumed to have been recorded by recorder 11 responsive to electrical signals produced by geophones 13, although it is further to be understood that a much larger number of geophones are used in actual practice. The output channels 23, therefore, will correspond in number to the geophones used in the seismic observation.

The output channel 23 is coupled to the input of a playback amplifier 35 through potentiometer 31, and through a resistor 33 connected between the tap of potentiometer 31 and the input circuit of amplifier 35. The output circuit of amplifier 35 is connected to the input circuit of a control voltage generator 57 through the contacts 29 of relay 25 and through electrical lead 71. The output circuit of amplifier 35 is further connected to the input circuit of a second amplifier 69 through contacts 39 of relay 43 and through electrical lead 73. The output circuit of amplifier 69 is connected to the input circuit of a visual recording device 65 which may be either a wiggly trace, variable density recording mechanism of conventional design, or the signal may be recorded on magnetic tape.

Control voltage generator 57 may be one of a number of conventionally designed circuits for relating the control voltage produced thereby to the total energy of, or the average amplitude of, the trace being sampled. For example, the generator 57 may be a mean square generator, a mean generator, or a root mean square generator. The output circuit of the control voltage generator 57 is connected to an integrating amplifier comprising an amplifier 55 connected in parallel with an integrating capacitor 53 in the usual manner. Paralleling the capacitor 53 is a short circuiting apparatus comprising relay contacts 47 and electrical lead 51. The purpose of the short circuiting apparatus will become apparent below.

The output circuit of the integrating amplifier is connected to the input circuit of a control amplifier 61. An oscillator 59 also is connected to the control amplifier 61. The amplifier 61 functions in effect as a modulator, and the output signal thereof has a frequency the same as that of oscillator 59, but its amplitude varies directly as the amplitude of the voltage applied thereto from the integrating amplifier, or in any special manner necessary to properly control amplifier 35. (This output signal forms a suppression voltage which is inversely related to the gain of amplifier 35.) The output signal from the control amplifier is rectified and filtered by apparatus 63 and is applied to the input of playback amplifier 35 through contacts 42 of relay 43. Thus, the amplitude of the output signal from the playback amplifier 35 will be varied inversely as the amplitude of the output signal from amplifier 61.

Relays 45, 25, and 43 are connected to camming switches in the recording mechanism 19 through electrical leads 21, 27, and 75, respectively. The camming switch connected to relay 25 functions to close the relay and to close contacts 29 after a time interval corresponding to the interval from initiation of the seismic impulse to detection of first arrivals by the geophone; a convenient time interval for this purpose is about 0.2 second. Manifestly, after this interval, data traces were recorded on the recording medium carried by the recorder 19. This camming switch also de-energizes the relay 25 so as to open contacts 29 at the end of the desired sampling period of the first recording cycle. The camming switch controlling relay 45 functions to actuate relay 45 to close contacts 47 momentarily at the end of two recording cycles of the recorder 19. The camming switch connected to relay 43 functions to close contacts 39 and 42 at the end of the first recording cycle, and to open contacts 39 and 42 at the end of the second successive recording cycle. Manifestly, other apparatuses for opening and closing the contacts 29, 39, 42, and 47 may be utilized, such as cams mechanically connected to the respective contacts through appropriate gear trains.

Assuming now that a reproducible seismogram has been placed in the magnetic tape reproducing mechanism 19, let it be further assumed that the mechanism 19 is activated so as to reproduce the seismogram through two complete reproduction cycles. After a time interval which may correspond to about 0.2 of a second on the seismogram time axis (i.e., after the first arrivals on the seismogram have been reproduced), relay 25 is actuated to close contacts 29. The signal on electrical lead or channel 23 is applied to the playback amplifier 35 at a level determined by the setting of the tap on potentiometer 31. The output signal applied to the playback amplifier is as illustrated in FIG. 3A. The output signal from the playback amplifier 35 is applied to the control voltage generator 57. The signal is rectified as shown in FIG. 3B. Further operations upon the control voltage signal may be performed at this time if desired. This signal is integrated by the integrating amplifier to produce the D.C. control level signal shown in FIG. 3C. This D.C. level is used to control the output gain of the control amplifier 61 into which the constant frequency, constant amplitude oscillator is fed. The frequency of the signal produced by the oscillator 59 should be well above the seismic frequency range (for example, about 3000 cycles). The adjusted constant frequency signal is fed to the gain control section of the programmed gain amplifier 35. This constant frequency signal is rectified and filtered to produce a substantially D.C. signal, the magnitude of which is determined by the magnitude reached by the output signal of the integrating amplifier at the end of the gated interval of the first reproduction cycle. This signal will remain constant during the second reproduction cycle, keeping the gain of amplifier 35 fixed at the desired level.

At the end of the first reproduction cycle, relay 43 is actuated to close contacts 39 and 42. This insures that the output signal from rectifier and filter 63 will remain of constant magnitude during the second reproduction cycle, and also permits this signal appearing on lead 79 to be applied to the playback amplifier 35 to vary the gain thereof as an inverse function of the magnitude reached by the signal on lead 79. At the end of the second reproduction cycle, relay contacts 47 close momentarily to discharge capacitor 53 and return the integrating amplifier output signal to its original level. Simultaneously, relay 43 is actuated to close contact 37 preparatory to another normalizing cycle.

In essence, the method described above amounts to measuring a characteristic of a seismic data trace over an extended portion of the trace after the portion of the trace corresponding to the recordation of the initially arriving shock energy, or "first arrivals" (the energy transmitted either directly through the weathered layer of the earth or by refraction from the interface between the weathered layer and the stratum immediately therebeneath), and relating this measurement to the gain control of a seismic amplifier during a subsequent re-recordation of the seismic data trace. When this technique is followed for each of the data traces of a seismogram, the traces are normalized, i.e., the gain setting of the amplifiers through which the electrical signal produced from the reproducible data traces are passed, is set so as to eliminate variations between the data traces produced by variable seismic impulse parameters and variable detection parameters. In the technique described above, the gain setting of the seismic amplifiers is determined by measuring the energy content of the traces. It is to be understood, however, that there are other characteristics of the traces that are suitable for use as normalization criteria, such as the absolute amplitude and the frequency of the traces.

The technique of the present invention can be carried out manually by measuring the output voltage of the integrating amplifier 55 and adjusting the setting of the tap on potentiometer 31 so that the voltage reading in the output of amplifier 55 is the same for all seismic traces on the section being studied. When this technique is followed there is no direct electrical connection between the output of integrating amplifier 55 and the input of playback amplifier 35. The tap of potentiometer 31 will be set at a standard setting for the first reproduction cycle of magnetic tape recorder 19, and will be adjusted in accordance with the output voltage of integrating amplifier 55 on the second reproduction cycle of the magnetic tape recorder 19.

It is further to be understood that the present invention also comprehends the use of a two-channel, trace by trace normalizer such that, while one trace is being reproduced to adjust the gain of the amplifier (i.e., while the trace is being sampled), another trace on the same seismogram is being reproduced and recorded, the gain of the amplifier 35 having been determined on the preceding reproduction cycle. Apparatus of this nature will permit a 24-trace seismogram to be normalized after 24 reproduction cycles.

Having described the principle of the invention and the best mode in which we have contemplated applying that principle, we wish it to be understood that the apparatus described is illustrative only and that other means can be employed without departing from the true scope of the invention.

What is claimed is:

1. In seismic exploration wherein a seismic impulse is injected into the earth at a first location, resulting earth movements are detected at a multiplicity of locations spaced from said first location, and the detected earth movements are converted into electrical signals which are recorded as data traces on a reproducible recording medium, the method of eliminating or reducing the effects of variable seismic impulse parameters and variable detecting parameters from the individual data traces, comprising:

reproducing at least a portion of each data trace after the portion thereof corresponding to the reproduction of first arrival signals on the seismogram as a first individual electrical signal;

detecting the average value of a characteristic of said individual electrical signal that is variable as the result of variations in said variable seismic impulse parameters and variable detecting parameters;

producing a control electrical signal having an amplitude that is indicative of said average value;

again reproducing said each data trace to produce a second individual electrical signal;

amplifying said second individual electrical signal by an amount that is an inverse function of the amplitude of said control signal; and recording said amplified signal.

2. In seismic exploration wherein a seismic impulse is injected into the earth at a first location, resulting earth movements are detected at a multiplicity of locations spaced from said first location, and the detected earth movements are converted into electrical signals which are recorded as data traces on a reproducible recording medium, the method of eliminating or reducing the effects of variable seismic impulse parameters and variable detecting parameters from the individual data traces, comprising:

reproducing at least a portion of each data trace after the portion thereof corresponding to reproduction of first arrival signals on the seismogram as a first individual electrical signal;

producing a control electrical signal having an amplitude indicative of the average value of a characteristic of said individual electrical signal that is variable as the result of variations in said variable seismic parameters and variable detecting parameters;

again reproducing said each data trace to produce a second individual electrical signal;

amplifying said individual electrical signal by an amount that is an inverse function of the amplitude of said control signal; and recording said amplified signal.

3. The method of claim 2 wherein said average value is the mean square of the first individual electrical signal.

4. Apparatus for processing a seismic trace recorded in reproducible form, comprising:

reproducing means for cyclicly reproducing said seismic trace as an electrical output signal;

amplifier means connected to said reproducing means for amplifying the output signal of said reproducing means;

first electrical circuit means for producing a control output signal having an amplitude indicative of the total energy content of an electrical signal applied thereto;

second electrical circuit means connected to said amplifier means for controlling the gain of said amplifier means responsive to the amplitude of a control electrical signal applied thereto;

electrical signal recording means; and control means connected to said reproducing means, to said amplifier means, to said first electrical circuit means, to said recording means, and to said second electrical circuit means for connecting the output of said amplifier means to said first electrical circuit means on the portion of a first reproduction cycle of said reproducing means after reproduction of first arrival events of said seismic trace, and for connecting the output of said amplifier means to said electrical signal recording means and connecting the output of said first electrical circuit means to said second electrical circuit means on second reproduction cycles of said reproducing means.

5. The apparatus of claim 4 wherein said first electrical circuit means comprises:

a control voltage generator for producing an output signal indicative of the energy content of an input signal applied thereto, integrator circuit means connected to said control voltage generator for integrating the output signal of said control voltage generator, a constant frequency alternating current source, and third circuit means connected to said constant frequency alternating current source and to said integrator circuit means for varying the amplitude of the output signal of said constant frequency alternating current source in accordance with the output signal of said integrator circuit means, and wherein said second electrical circuit means includes rectifier and filter means connected to the input of said amplifier means for rectifying and filtering the output signal from said constant frequency alternating current source produced by said third circuit means, and means for applying the rectified and filtered signal to said amplifier means for controlling the gain thereof.

6. The apparatus of claim 5 wherein there is further included means connected to said integrator circuit means for restoring the output signal of said integrator circuit means to a reference level at the end of said second reproduction cycle.

7. Apparatus for processing a seismic trace recorded in reproducible form, said trace including first arrival events followed by later events, comprising:

reproducing means for cyclicly reproducing said seismic trace as an electrical output signal;

amplifier means connected to said reproducing means for amplifying the output signal of said reproducing means;

first electrical circuit means for producing a control electrical signal indicative of the total energy content of the electrical signal produced by said reproducing means on first reproduction cycle of said reproducing means after reproduction of said first arrival events on said trace; and means connected to said recording means, to said amplifier means, and to said first electrical circuit means for controlling the gain of said amplifier means on second reproduction cycles of said reproducing means with the control electrical signal produced by said first electrical circuit means on the immediately preceding first reproduction cycle, and for recording the output signal of said amplifier means on said second reproduction cycles of said reproducing means.

References Cited by the Examiner
UNITED STATES PATENTS

| | | | |
|---|---|---|---|
| 2,723,387 | 11/1955 | Slavin | 340—15.5 |
| 2,838,742 | 6/1958 | McManis | 340—15.5 |
| 2,939,107 | 5/1960 | Ball | 340—15.5 |
| 2,982,919 | 5/1961 | Montgomery | 340—15.5 |
| 3,209,316 | 9/1965 | Sparks | 340—15.5 |

BENJAMIN A. BORCHELT, *Primary Examiner.*

SAMUEL FEINBERG, *Examiner.*

R. M. SKOLNIK, *Assistant Examiner.*